United States Patent [19]

Sherman

[11] Patent Number: 5,462,147
[45] Date of Patent: Oct. 31, 1995

[54] ENGAGEMENT CONTROL MECHANISM FOR A TORQUE TRANSMITTING DEVICE

[75] Inventor: James F. Sherman, Brighton, Mich.

[73] Assignee: General Motors Corporation, Detroit, Mich.

[21] Appl. No.: 255,600

[22] Filed: Jun. 8, 1994

[51] Int. Cl.[6] .................................................. F16D 67/04
[52] U.S. Cl. .................. 192/18 A; 192/12 C; 192/48.91; 475/142
[58] Field of Search ...................... 475/142, 311; 192/18 A, 12 C, 87.16, 87.15, 48.91, 3.57; 477/143, 156

[56] References Cited

U.S. PATENT DOCUMENTS

| | | | |
|---|---|---|---|
| 2,836,270 | 5/1958 | Leopold | 192/12 C |
| 2,870,655 | 1/1959 | Rockwell | 192/18 A X |
| 3,069,929 | 12/1962 | Hansen | 192/18 A X |
| 3,164,036 | 1/1965 | Lamburn et al. | 192/18 A X |
| 3,295,394 | 1/1967 | Whateley | 192/18 A X |
| 5,026,334 | 6/1991 | Jeffries | 475/142 |

*Primary Examiner*—Rodney H. Bonck
*Attorney, Agent, or Firm*—Donald F. Scherer

[57] ABSTRACT

A pair of selectively operable torque transmitting devices, such as a clutch and brake, are provided to control the torque and speed ratio in a planetary gear set. One device, a clutch, is spring engaged, to provide direct drive in the planetary set, and fluid released by a selectively operable piston assembly. The other device, a brake, is pressure engaged by a selectively operable piston assembly to establish a drive ratio in the planetary set. A torque responsive mechanism is incorporated in the piston assembly to control the overlap between the clutch/brake exchange during a ratio interchange.

4 Claims, 2 Drawing Sheets

ENGAGEMENT CONTROL MECHANISM FOR A TORQUE TRANSMITTING DEVICE

TECHNICAL FIELD

This invention relates to engagement control mechanisms for friction operated torque transmitting devices, and more particularly, to mechanisms for controlling the overlap between an on-coming device and an off-going device.

BACKGROUND OF THE INVENTION

Many planetary transmissions have upshift and/or downshift conditions before and after which the same planetary gear set provides the drive ratio, i.e., underdrive/direct drive or direct drive/overdrive. During the interchange or shift sequence, it is desirable to avoid both friction device overlap and engine flare. The overlap condition occurs when two friction devices are engaged with sufficient capacity to simultaneously transmit a significant amount of torque. This results in a torque sag which is noticeable by the operator. Engine flare occurs when neither friction device has sufficient capacity to transmit the engine torque. This results in an engine revving condition and slipping of at least one of the friction devices.

In most planetary type transmissions, the ratio interchange is controlled by at least one one-way torque transmitting device, such as a clutch or brake. The one-way torque transmitter will release only when the oncoming device has sufficient capacity to transmit the required torque or will engage when the off-going device can no longer support the torque level. When one of the torque transmitting devices has a band brake which is engaged by a fluid operated servo, a "wash out" shift can be employed. With this arrangement, the pressure at the on-coming device is also directed to a release chamber in the servo. Thus, as the on-coming device gains torque capacity, the off-going (band brake) device loses capacity. This permits a smooth ratio interchange under most conditions.

With the advent of electronically controlled transmissions, the management of friction device overlap is given to a computer or central processor (CPU), which can control the pressure at each individual device. This will permit, with the engineers term, a "clutch-to-clutch" shift. That is, both the on-coming and off-going devices are of the disc type whether they are employed as either a clutch or brake.

However, the electronic controls do add to the cost and complexity of the transmission, such that many transmission manufacturers continue to use one-way devices and "wash out" sequencing to control the ratio interchange while using a CPU and electronic controls to establish control pressures and shift point regulation.

The use of electronic controls for pressure control is, of course, advantageous in that adaptive type controls can be utilized. That is, the control pressures can be modified depending upon the outcome of the previous events. For example, if a shift is too harsh, the electronic control will be informed of that fact and will, under the same shift conditions, reduce the rate of pressure increase to the in-coming device until the desired shift smoothness is achieved.

SUMMARY OF THE INVENTION

This invention relates to torque transmitting devices, wherein a single fluid operated piston is utilized to control the interchange between two friction devices to create a basis for "clutch timing". The relationship between the on-coming and off-going devices and structures incorporating the present invention, is controlled by an adjustable ring member which is positioned to establish the engaging or disengaging condition of one of the devices relative to the engaging and disengaging position of the other device.

The physical relationship presented by this device is adjusted within the torque transmitting member based on a vehicle operating parameter, such as input torque, to provide a proper relationship between the on-going and off-going elements during the torque phase of the shift. The combined capacity of the friction elements is higher than the input torque with the off-going element reaching zero capacity at torque reversal.

Adaptive controls can be utilized to adjust the apply release member to accommodate the changes in friction element wear and/or part variation from the build or production tolerances that will normally occur in such devices.

It is an object of this invention to provide an improved torque transmitting arrangement having two selectively actuated friction devices, wherein a piston assembly is effective to establish a ratio interchange in a planetary gear set and control the shift overlap.

It is another object of this invention to provide an improved torque transmitting arrangement having two selectively actuated friction devices, as above, wherein the shift overlap between the friction devices is adjustably controlled in response to a vehicle operating parameter.

It is a further object of this invention to provide an improved torque transmitting arrangement having two selectively actuated friction devices, as described above, wherein an adjustable mechanical member is responsive to the vehicle operating parameter to establish the initiation of engage/disengage position for one of the friction devices.

It is still another object of this invention to provide an improved torque transmitting arrangement, wherein a single piston is operable to control a ratio interchange in a planetary gear set by reducing the torque capacity of one friction device and simultaneously increasing the torque capacity of another friction device, and wherein an engagement surface on the piston is adjustable to control the torque transmitting overlap of the two friction devices.

These and other objects and advantages of the present invention will be more apparent from the following description and drawings.

DESCRIPTION OF THE EXEMPLARY EMBODIMENTS

Figure 1:
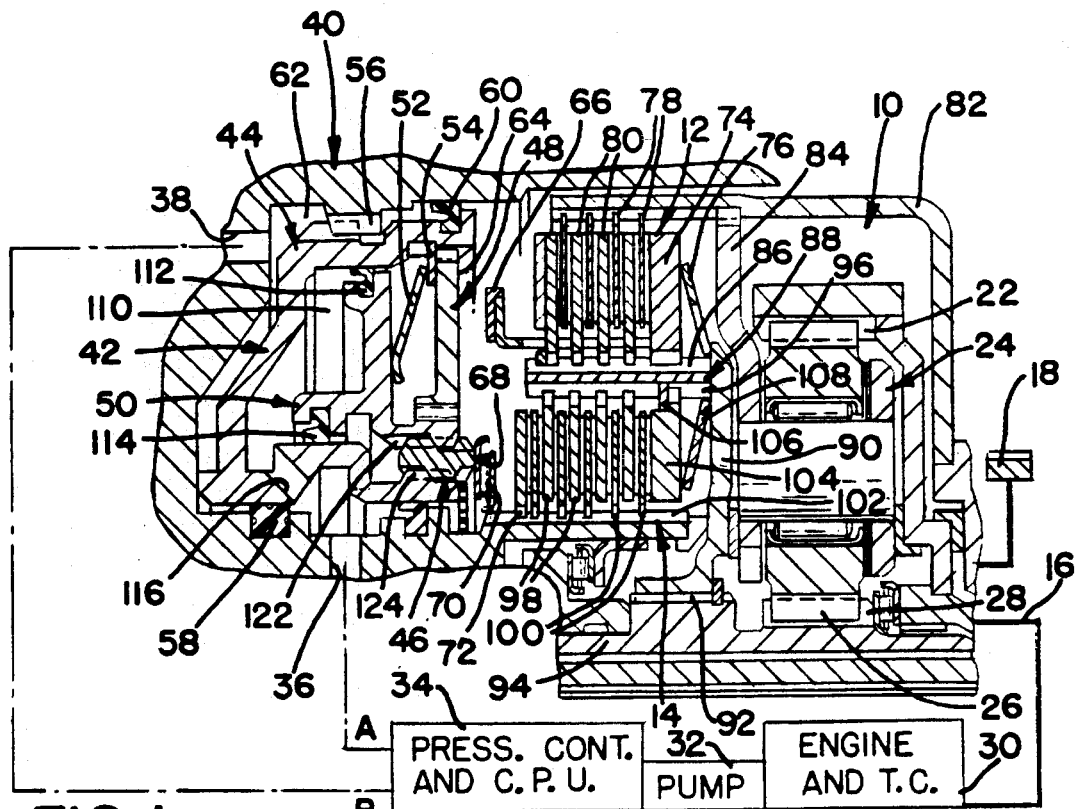
FIG. 1 is a diagrammatic view of a cross section of a portion of a transmission incorporating a planetary gear arrangement and a schematic representation of controls for establishing the operation of friction devices.

A planetary gear arrangement 10 is shown in FIG. 1. This arrangement 10 is controlled by a clutch 12 and a brake 14 to provide a direct drive or an underdrive between an input shaft 16 and an output sprocket or shaft 18. The input shaft 16 is connected with a ring gear 22 while the sprocket 18 is connected with a planet carrier 24. The planet carrier 24 supports a plurality of pinion gears 26 which are disposed in meshing relationship with the ring gear 22 and a sun gear 28. The planetary gear arrangement works in a well known manner, such that if any two of the members, such as the planet carrier 24 and the sun gear 28 are connected together, a one-to-one drive ratio between the input shaft 16 and sprocket 18 are provided. In the alternative, if one of the members, such as the sun gear 28 is grounded, the planetary set will provide an underdrive ratio between the input shaft 16 and the output shaft 18. This is, of a course, a conventional planetary arrangement and the attributes thereof are well known, as are the various ratios that can be accomplished by providing input and output drives from various members of the planetary.

The input shaft 16 is drivingly connected to a engine and torque converter arrangement 30 which are well known devices for providing power input to planetary transmissions. The engine and torque converter arrangement 30 also include a positive displacement pump 32 which is operable to provide fluid pressure to a pressure control and electronic CPU 34. The pressure control and electronic CPU are also well known devices which are commonly used in automatic transmissions to provide the desired pressure levels for controlling friction devices and shift valve elements, and also for controlling the interchange between friction devices when a ratio change within the planetary gear set is desired.

The pressure control and electronic CPU provide outputs A and B which are connected to fluid ports 36 and 38, respectively, formed in a stationary housing 40. The housing 40 also slidably supports a piston assembly 42 which is comprised of an apply piston 44, an adjusting ring 46, an engagement control plate or member 48 and an adjusting piston 50.

A Belleville, diaphragm or washer type spring 52 is disposed between a locking ring 54 secured in the apply piston 44 and the adjusting piston 50 to maintain separation between the adjusting piston 50 and the engagement control member 48. The apply piston 44 is slidably disposed in the housing 40 and is prevented from rotation relative thereto by a spline interconnection 56.

Figure 2:
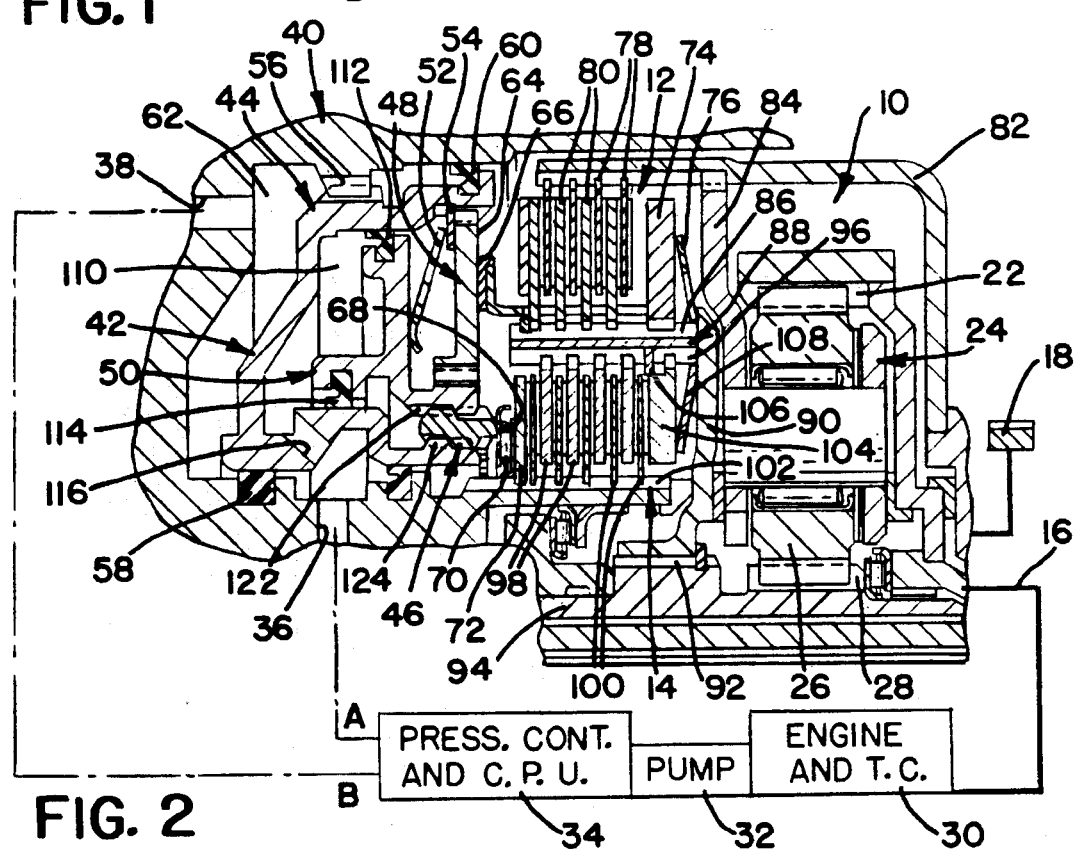
FIG. 2 is a view similar to FIG. 1 describing an alternate operating position of the friction devices.

A pair of annular seal members 58 and 60 cooperate with the piston 44 and the housing 40 to provide an apply chamber 62 which is in fluid communication with the port 38. Fluid pressure in the chamber 62 supplied through the port 38 will cause the piston assembly 42 to move rightward, as viewed in FIGS. 1 and 2, such that the engagement control member 48 will present an engagement control surface 64 for abutment with a control ring 66, as seen in FIG. 2. The adjusting ring 46 is also movable axially with the piston assembly 42, such that an engagement control surface or edge 68 will bear against a needle bearing 70 to control engagement between the piston assembly 42 and a pressure plate 72 formed as a member of the brake 14.

The ring 66 is a member of the clutch 12 and is operable on an apply plate 74 to urge the apply plate 74 against a washer or Belleville type spring 76 which provides the engagement control for the clutch 12. The clutch 12 is further comprised of a plurality of interspersed friction discs or plates 78 and steel discs or plates 80. The friction discs 78 are splined to a housing 82 which is secured to the sprocket 18 and to a side plate 84 of the carrier 24.

As best seen in FIG. 2, the apply plate 74 has been moved rightward by the ring 66, such that separation between the friction plates 78 and steel plates 80 will occur resulting in disengagement of the clutch 12. The steel plates 80 are connected through a spline 86 formed on a hub 88. The hub 88 is connected through a wall or annular plate 90 and a spline connection 92 to a shaft 94 on which the sun gear 28 is formed. Thus, the clutch 12 will provide a drive connection between the sun gear 28 and the carrier 24, resulting in a one-to-one or direct drive in the planetary arrangement 10.

The hub 88 also has an annular inner spline portion 96 to which is splined a plurality of steel plates 98 which in turn are interleaved with a plurality of friction plates 100. These plates 98 and 100 are components within the brake 14. The plates 100 are connected at their inner diameter to a spline 102 which is formed in the housing 40. Thus, the plates 100 are stationary with the housing 40 and the plates 98 are connected with the sun gear 28.

When the fluid pressure in chamber 62 is sufficient to move the piston assembly 42 rightward thereby disengaging the clutch 12 through operation on the spring 76, the plate 72 is urged rightward by the adjusting ring 46 to enforce frictional engagement between the plates 98 and 100. Leftward to rightward movement of the adjusting ring 46 causes a backing plate 104 to move rightward away from a retaining ring 106 against the return force or reaction force in a washer or Belleville type spring 108.

The brake 14 is thereby engaged with a force substantially equal to that applied by the fluid pressure in chamber 62 as reacted against by the spring 108. When the brake 14 is engaged, the sun gear 28 is held stationary, such that input drive to the ring gear 22 will result in a reduced or underdrive at the carrier 24 which is delivered to the sprocket 18 for output from the planetary gear set 10. The sprocket 18 then can be connected in a well known manner through a chain drive or gear drop to a conventional multi-speed planetary transmission, such that the planetary arrangement 10 provides a two speed input to a multi-speed planetary transmission in a well known manner.

The adjusting piston 50 is slidably disposed in a chamber 110 formed in the apply piston 44. The chamber 110 cooperates with a pair of annular seals 112 and 114 disposed on the piston 50 to provide a control chamber for fluid pressure admitted through the port 36. Fluid pressure at the port 36 is directed through a passage 116 formed in the piston 44 to be supplied to the chamber 110. Fluid pressure in the chamber 110 operates on the piston 50 to urge the piston 50 against the washer spring 52. If the fluid pressure in chamber 110 is greater than the force in the washer spring 52, the piston 50 will move rightward, if the opposite is true, the piston 50 will move leftward. Rightward and leftward movement of the piston 50 is transmitted to the ring 46.

Figure 3:
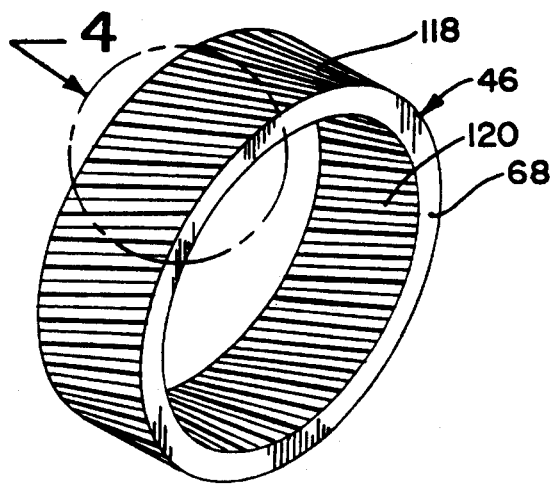
FIG. 3 is a perspective view of an adjustable member disposed within the friction devices described in FIG. 1.
Figure 4:
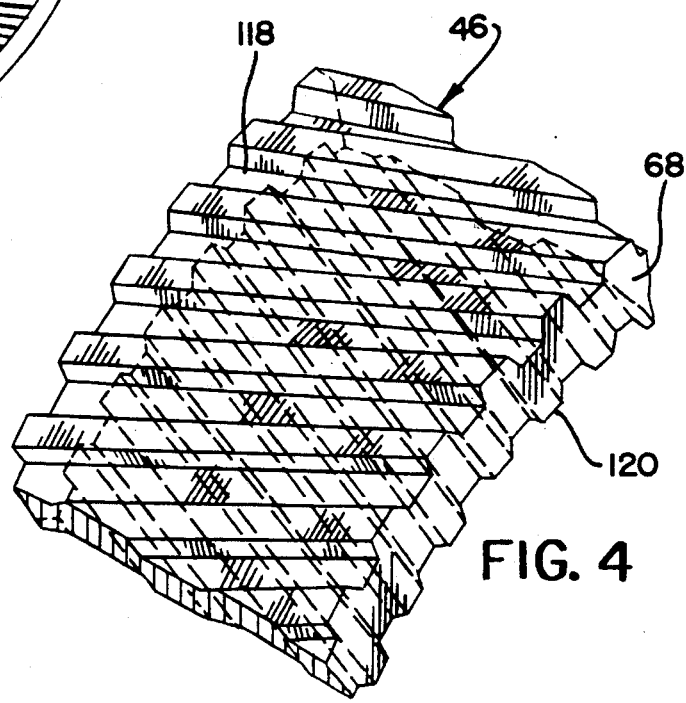
FIG. 4 is an enlarged view of the encircled portion of the device shown in FIG. 3.

As best seen in FIGS. 3 and 4, the ring 46 has an outer surface 118 and an inner surface 120. These surfaces have formed therein opposite helixes which are engaged with helixes 122 and 124 formed on the adjusting piston 50 and apply piston 44, respectively. The axial movement of the adjusting piston 50 will, through cooperation of the helix 122 and outer surface 118, enforce rotary movement to the adjusting ring 46. The rotary movement of the adjusting ring 46 will be reacted against the inner surface 120 and helix 124 to enforce linear or axial movement of the adjusting ring 46. Thus, fluid pressure in the chamber 110 results in axial adjustment of the ring 46 relative to the engagement control surface 64 which, as previously mentioned, controls the disengagement and engagement of the clutch 12.

By controlling the axial relationship between edge 68 of the ring 46 and the engaging surface 64 of the plate 48, the overlap condition between the clutch 12 and brake 14 can be controlled. If the pressure in chamber 110 is increased, the axial relationship between the surfaces 64 and 68 will be made larger, such that the brake 14 will be engaged earlier in the disengagement of the clutch 12 and, likewise, the brake 12 will be disengaged earlier in the engagement of clutch 12. The fluid pressure in chamber 110 is proportional to at least one vehicle operating parameter. It is preferably proportional to engine input torque which is one of the components to be reviewed during clutch overlap.

During an upshift, that is the ratio will be changed from an underdrive to a direct drive, it is desirable to begin disengagement of the brake 14 early in the engagement cycle of the clutch 12 when the engine torque is at a low level. In fact, at coast upshifts, it is desirable to substantially completely disengage the brake prior to engagement of the clutch. However, at higher torques, it is desirable to maintain the brake engaged through a portion of the clutch engagement, such that the available torque will be absorbed or controlled during the torque phase of the ratio interchange.

During a ratio interchange, which will result in an upshift, the shift is initiated when the oil supplied through port 38 to the chamber 62 is reduced. When this occurs, the spring 76 pushes directly on the apply plate 74 and the apply piston 44. The spring 108 pushes through the brake 14, comprised of plates 98 and 100. The clutch 12 begins carrying engine load when the apply plate 74 makes contact with the clutch pack comprised of plates 78 and 80. The gain of the friction devices is dependant upon various physical components, such as compressibility of the friction material, flatness of the plates, plate thickness variation, the number of plates in each device, the rate of the relative apply springs and other factors which might be affected during the production process or during the operation of the transmission.

As the apply plate 74 makes contact with the direct clutch pack, the adjusting ring 46 permits the backing plate 104 to contact the retaining ring 106. The brake 14 then begins to decrease in capacity. The gain of the brake 14 must be higher to be released just before the clutch 12 is able to carry the input torque. When the clutch 12 capacity is higher than the input torque, the inertia phase of the shift is started, and the reduction of oil pressure in the chamber 62 is stopped and held at a constant, thereby controlling the capacity of the clutch 12 at a predetermined level until the shift is completed. When the shift is completed, the oil in chamber 62 is reduced to exhaust pressure and the spring 76 applies the clutch 12 to full capacity.

To control a downshift, that is, a ratio change from direct drive to underdrive, the oil in chamber 62 is increased in pressure at a controlled rate. When this occurs, the piston 44 contacts the apply plate 74, thereby compressing spring 76 to reduce the capacity of the clutch 12 which begins to slip when its capacity is below input torque to allow the engine to increase in speed. As the piston 44 advances, clutch 12 loses capacity and the ring 46 begins compressing the brake 14 which in turn begins to transmit torque. When the brake 14 reaches input torque capacity, the shift is completed. The timing of this interchange, to prevent engine flare or sag, is accomplished by adjusting the piston 50 through the use of fluid pressure in chamber 110. When the shift is completed, the piston 44 will continue to advance, compressing the springs 108 and 76 to provide full engagement of the brake 14 and running clearance for the clutch 12.

Thus, it can be seen from the above description that the axial adjustment of the piston 50, which results in linear or axial movement of the adjusting ring 46, will result in controlling the overlap between the engaging and disengaging functions of the clutch 12 and brake 14.

Figure 5:
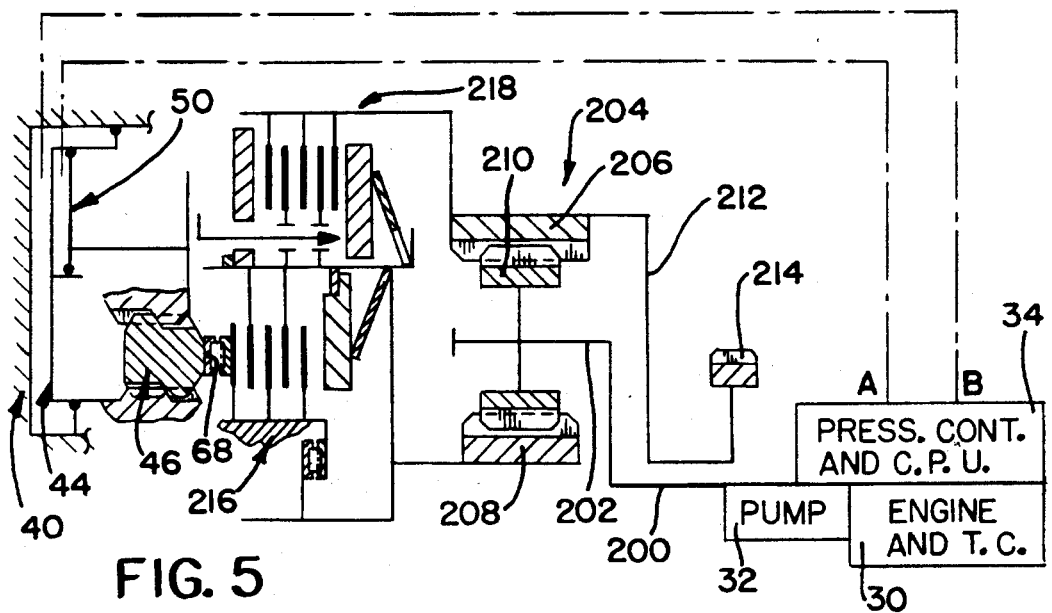
FIG. 5 is a schematic representation of an alternative embodiment of the gear arrangement described in FIG. 1, wherein the friction devices control a direct drive and an overdrive.

An alternative embodiment is shown in FIG. 5. In this embodiment, the engine and torque converter 30 provides an input drive through a shaft 200 to a carrier 202 of a planetary gear set 204. The planetary gear set 204 also is comprised of a ring gear 206, a sun gear 208 and a plurality of pinion gears 2 10 which are disposed in meshing relationship with the ring gear 206 and sun gear 208. The ring gear 206 is drivingly connected via a hub 212 to a sprocket or output gear 214.

A fluid operated brake 216 is operable to establish the sun gear 208 as a selective reaction member in the planetary gear arrangement, while a spring apply clutch 218 is operable to provide a direct drive relationship between the ring gear 206 and the sun gear 208. When the brake 216 is applied, the sun gear 208 is established as a reaction device in the planetary gear set 204, such that input drive to the carrier 202 results in an overdrive at the ring gear 206 and therefore the sprocket 214. As is well known, an overdrive results in a higher output speed relative to the input speed.

When the clutch 218 is engaged, the sun gear and ring gear are interconnected such that a 1:1 drive is established within the planetary gear arrangement 204, thereby resulting in the input speed at shaft 200 and the output speed at sprocket 214 being equal.

As with the embodiment disclosed in FIGS. 1 and 2, the clutch 218 is a spring engaged, pressure released device, while the brake 216 is a fluid engaged, spring released device. The shift sequences are the same as those described above for FIGS. 1 and 2. That is, the overlap between the clutch 218 and brake 216 are controlled such that proper overlap exists during an upshift and downshift without excessive engine flare or torque sag.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid operated torque transmitting means comprising:

a spring applied friction torque transmitting means;

a fluid pressure applied friction torque transmitting means;

a stationary housing;

a fluid operated piston means slidably disposed in said housing and being linearly movable in one direction in response to fluid pressure for enforcing disengagement of said spring applied torque transmitting means and for enforcing engagement of said fluid pressure applied friction torque transmitting means; and overlap engagement adjustment means disposed on said fluid operated piston means and being responsive to a control pressure to establish a linear position of a control surface on the fluid operated piston means at which the engagement of the fluid pressure applied friction torque transmitting means begins relative to the beginning of disengagement of the spring applied torque transmitting means.

2. A fluid operated torque transmitting means defined in claim 1, wherein the overlap engagement adjustment means comprises an adjusting ring having means for enforcing rotary movement thereof relative to said fluid operated piston means.

3. A fluid operated torque transmitting means defined in claim 2, wherein said adjusting means further comprises means for enforcing linear movement of the adjusting ring in response to said rotary movement.

4. A fluid operated torque transmitting means defined in claim 2, wherein said adjusting means further comprises fluid operated means connected with said rotary movement enforcing means for urging linear movement thereof in response to a pressure proportional to a vehicle operating parameter.

* * * * *